US011964271B2

(12) United States Patent
Xia et al.

(10) Patent No.: US 11,964,271 B2
(45) Date of Patent: Apr. 23, 2024

(54) DROP PREPARATION DEVICE AND DROP PREPARATION METHOD

(71) Applicant: PILOT GENE TECHNOLOGY (HANGZHOU) CO., LTD., Zhejiang (CN)

(72) Inventors: Jiang Xia, Zhejiang (CN); Zhuhai Wang, Zhejiang (CN)

(73) Assignee: PILOT GENE TECHNOLOGY (HANGZHOU) CO., LTD., Zhejiang (CN)

( * ) Notice: Subject to any disclaimer, the term of this patent is extended or adjusted under 35 U.S.C. 154(b) by 0 days.

(21) Appl. No.: 18/197,144

(22) Filed: May 15, 2023

(65) Prior Publication Data

US 2024/0033724 A1 Feb. 1, 2024

Related U.S. Application Data

(63) Continuation of application No. PCT/CN2023/092550, filed on May 6, 2023.

(30) Foreign Application Priority Data

Jul. 27, 2022 (CN) ......................... 202210895822.5

(51) Int. Cl.
*B01L 3/00* (2006.01)
*B01L 3/02* (2006.01)

(52) U.S. Cl.
CPC ......... *B01L 3/0241* (2013.01); *B01L 3/50273* (2013.01); *B01L 2300/042* (2013.01);
(Continued)

(58) Field of Classification Search
None
See application file for complete search history.

(56) References Cited

U.S. PATENT DOCUMENTS 5,346,672 A * 9/1994 Stapleton .................. B01L 7/52 422/947
2003/0017496 A1* 1/2003 Tanaami .............. B01J 19/0046 427/2.11

(Continued)

FOREIGN PATENT DOCUMENTS

CN 102679039 A 9/2012
CN 103092222 A 5/2013

(Continued)

OTHER PUBLICATIONS

International Search Report of Corresponding Application No. PCT/CN2023/092550; dated Aug. 1, 2023; 4 Pgs.

*Primary Examiner* — Brian R Gordon
(74) *Attorney, Agent, or Firm* — Cooper Legal Group, LLC

(57) ABSTRACT

The present application discloses drop preparation device and drop preparation method and relates to the technical field of biochip. In the drop preparation device, the chip, the temperature control module and the pressure detection unit are provided in the cavity, the temperature control module is configured for adjusting a temperature value in the chip, and the pressure detection unit is configured for detecting a pressure data in the cavity; two chip ports, that is, a sample inlet and an oil inlet are provided at the top of the chip; the perforated cap has a vent hole and is elastically deformed to change a volume of the vent hole. When the perforated cap is directly connected to the oil inlet, the pressing assembly is lifted or lowered to open or cover the vent hole. When the pressing assembly covers the oil inlet, a pressure difference is formed in the chip.

7 Claims, 7 Drawing Sheets

(52) U.S. Cl.
CPC ..... *B01L 2300/048* (2013.01); *B01L 2300/18* (2013.01); *B01L 2400/0487* (2013.01)

(56) References Cited

U.S. PATENT DOCUMENTS

2003/0138819 A1* 7/2003 Gong .................... B01L 3/5027 435/6.12
2004/0202994 A1* 10/2004 Timperman ........... B01D 57/02 435/288.5
2005/0201901 A1* 9/2005 Grossman ............. B01L 3/5635 422/400
2005/0214173 A1* 9/2005 Facer ................ B01L 3/502707 422/400
2005/0226780 A1* 10/2005 Sandell ............... B01L 3/50851 422/400
2006/0216812 A1* 9/2006 Okada ............... B01L 3/502715 435/288.5
2007/0243523 A1* 10/2007 Ionescu-Zanetti ........................... G01N 15/1484 977/924
2007/0254372 A1* 11/2007 Bickel ................ G01N 21/6428 436/164
2009/0023201 A1* 1/2009 Hongo ................ B01L 3/50273 435/287.2
2009/0148858 A1* 6/2009 Patel ................... B01L 3/50273 435/7.1
2010/0167406 A1* 7/2010 Streit ...................... B01L 3/502 702/50
2018/0071739 A1 3/2018 Khalilabad et al.

FOREIGN PATENT DOCUMENTS

CN 108707536 A 10/2018
CN 212222935 U 12/2020
CN 115254217 A 11/2022

* cited by examiner

DROP PREPARATION DEVICE AND DROP PREPARATION METHOD

CROSS-REFERENCE TO RELATED APPLICATION

This application is a continuation of PCT application serial no. PCT/CN2023/092550, filed on May 6, 2023, which claims the priority and benefit of Chinese patent application serial no. 202210895822.5, filed on Jul. 27, 2022. The entireties of PCT application serial no. PCT/CN2023/092550 and Chinese patent application serial no. 202210895822.5 are hereby incorporated by reference herein and made a part of this specification.

TECHNICAL FIELD

The present application relates to the technical field of a biochip, and particularly to a drop preparation device and a drop preparation method.

BACKGROUND ART

In a current digital PCR (polymerase chain reaction) drop preparation technology, a drop is produced by a drop preparation device, which includes a chip provided in a cavity. In the cavity, the drop is produced in the chip by applying a varied pressure in the chip. However, there is a problem of pressure fluctuation since merely the pressure is regulated for controlling production of the drops. Therefore, there will be a problem of poor drop production quality, uneven size of drops, and the like.

Therefore, improving the quality of the drops as produced is a problem needed to be solved by those skilled in the technical field at present.

SUMMARY

In view of this, an objective of the present application is providing a drop preparation device and a drop preparation method, which can improve the quality of drops as produced.

In order to achieve the above objective, the present application provides the following technical solution:

a drop preparation device, including a cavity, a chip, a pressure detection unit, a temperature control module, a pressing assembly and a perforated cap; wherein the chip, the temperature control module and the pressure detection unit are provided in the cavity, the temperature control module is configured for adjusting a temperature value in the chip, and the pressure detection unit is configured for detecting a pressure data in the cavity; a top of the chip has two chip ports which are a sample inlet and an oil inlet; the perforated cap has a vent hole penetrating through the perforated cap along an up-down direction, and is configured to be elastically deformed along the up-down direction under a pressing force to change a volume of the vent hole; and when the perforated cap is directly connected to the oil inlet, the vent hole is in communication with the oil inlet, the pressing assembly is lifted or lowered to open or cover a top end of the vent hole to open or cover the oil inlet correspondingly; and when the pressing assembly covers the oil inlet, a positive pressure is applied into the chip through the sample inlet to form a pressure difference in the chip.

In an embodiment, the drop preparation device further includes a vent cap. When the vent cap is directly connected to the sample inlet, an air inlet channel is formed between an inner surface of the vent cap and an outer surface of the chip close to the sample inlet; and a bottom of the air inlet channel acts as an inlet end, and a top end thereof is in communication with the sample inlet.

In an embodiment, the vent cap and the perforated cap can be alternatively connected with the two chip ports; when the vent cap and the perforated cap are separately connected to the two chip ports, a top surface of the perforated cap is higher than that of the vent cap, the pressing assembly is pressed to cover a top surface of the vent hole to cover a first chip port directly connected to the perforated cap, and a second chip port is in communication with the cavity; and wherein when the vent cap is directly connected to the oil inlet, an air outlet channel is formed between the inner surface of the vent cap and the outer surface of the chip close to the oil inlet; and the bottom of the air inlet channel acts as an outlet end, and a top end thereof is in communication with the oil inlet.

In an embodiment, a part of a top surface of the first chip port directly connected to the perforated cap is covered by the perforated cap, and a remaining part thereof is in communication with the vent hole.

In an embodiment, the chip includes an inlet arm, an outlet arm and a bottom arm provided between a bottom of the inlet arm and a bottom of the outlet arm to form a U-shaped structure by the inlet arm, the outlet arm and the bottom arm; the top end of the inlet arm acts as the sample inlet, and the top end of the outlet arm acts as the oil inlet.

In an embodiment, the chip is attached onto a top surface of the temperature control module under pressure.

In an embodiment, a drop preparation method conducted by using the above drop preparation device includes:

real-time receiving a pressure data detected by the pressure detection unit;

determining whether the pressure data exceeds a preset pressure range; and, if yes, performing a selected adjusting step to adjust an actual drop size in the chip to the drop size under the preset pressure range;

wherein at least one adjusting step is a first adjusting step, including adjusting the temperature value by only controlling the temperature control module.

In an embodiment, when the perforated cap is directly connected to the oil inlet and the pressing assembly covers the vent hole, at least one adjusting step is a second adjusting step, including only adjusting the pressing force against the perforated cap by the pressing assembly.

In an embodiment, when the perforated cap is directly connected to the oil inlet and the pressing assembly covers the vent hole, at least one adjusting step is a third adjusting step, including adjusting the temperature value by controlling the temperature control module while adjusting the pressing force against the perforated cap by the pressing assembly.

In an embodiment, when the perforated cap is directly connected to the sample inlet, before receiving the pressure data detected by the pressure detection unit in real time, the method further includes:

controlling the pressing assembly to cover the vent hole to cover the sample inlet, and providing a negative pressure to the oil inlet through the cavity, so as to form the pressure difference in the chip.

In another aspect, a drop preparation device provided in the present application includes a cavity, a chip, a pressure detection unit, a temperature control module, a pressing assembly and a perforated cap; the chip, the temperature control module and the pressure detection unit are provided in the cavity, the temperature control module is configured for adjusting the temperature value in the chip, and the pressure detection unit is configured for detecting the pressure data in the cavity; the top of the chip has two chip ports acting as a sample inlet and an oil inlet respectively; the perforated cap has a vent hole penetrating through the perforated cap along an up-down direction and is configured to elastically deformed along the up-down direction under a pressing force to change a volume of the vent hole.

When the perforated cap is directly connected to the oil inlet, the vent hole is in communication with the oil inlet, and the pressing assembly is lifted or lowered to open or cover the top end of the vent hole by the lifting motion to open or cover the oil inlet correspondingly. When the pressing assembly covers the oil inlet, a positive pressure can be applied by the cavity into the chip through the sample inlet to form a pressure difference in the chip.

In the drop preparation device, the pressure data can be detected by the pressure detection unit in real time, and the temperature value can be adjusted by controlling the temperature control module and/or a pressing condition of the pressing assembly can be adjusted to adjust a production speed and drop size of drop during drop production, which can eliminate an impact on the drop production due to a difference between current pressure data and the preset pressure data, so as to improve the quality of drops as produced. Then the pressure difference between the sample inlet and the oil inlet reaches an equilibrium by slowly lifting the pressing assembly until it leave the perforated cap. At this time, the drop production is stopped, the drops stop moving, and air exhausting is performed via an exhaust hole in the cavity to reach an equilibrium between the pressures inside and outside the cavity, so that a large number of drops can be produced uniformly and quickly.

In order to achieve the above objective, the present application also provides the following technical solution:

In a first aspect, a drop preparation device includes a housing, and a chip, a pressing assembly and a temperature control module provided in the housing; the temperature control module is provided at a bottom of the housing, the chip is provided on the temperature control module, the pressing assembly is provided on a top of the housing, and the temperature control module is configured to cooperate with the pressing assembly for adjusting a drop size.

In an embodiment, the housing is connected to an external pressure source, and a pressure detection unit is provided between the housing and the pressure source.

In an embodiment, the chip is defined with a sample inlet and an oil inlet, a perforated cap is provided at the oil inlet of the chip, and has a vent hole penetrating through the perforated cap along a vertical direction, and the perforated cap is configured to cooperate with the pressing assembly for adjusting the pressure in the chip.

In an embodiment, the perforated cap is sleeved on the chip, and the perforated cap is an elastic component.

In an embodiment, a projection of the vent hole is within a projection range of the oil inlet in a plane where the chip is located.

In an embodiment, the pressing assembly includes a pressing motor and a pressing plate, the pressing motor is fixedly connected to the housing and slidably connected to the pressing plate, and a projection of the perforated cap is within a projection range of the pressing plate in the plane where the chip is located.

In an embodiment, the sample inlet of the chip is provided with a vent cap sleeved on the chip, the vent cap has an air inlet channel leading to the chip and in communication with the chip.

In an embodiment, the chip includes an inlet arm and an outlet arm, both the inlet arm and the outlet arm are fixedly connected to the chip and extend towards the pressing plate, the sample inlet is provided at a lower end of the inlet arm, and the oil inlet is located at a lower end of the outlet arm.

In a second aspect, a drop preparation method is provided, including the following steps:

- presetting a pressure value through the pressure detection unit;
- adjusting a temperature in the chip through the temperature control module;
- adjusting a pressure in the chip through the pressing assembly; and
- detecting the pressure in the chip through the pressure detection unit, and determining whether the pressure in the chip is within a preset pressure range; and, if yes, stopping adjusting the temperature and pressure; and, if no, adjusting the pressure and/or temperature until the pressure in the chip is within the preset pressure range.

In summary, the present application can achieve at least one of the following technical effects:

1. the temperature and pressure in the chip are detected by using the temperature control module and the pressure detection unit, respectively, environmental parameters in the chip are adjusted and controlled by the temperature control module and the pressing assembly according to preset pressure value, so that drops with a good quality and uniform drop size can be produced.

BRIEF DESCRIPTION OF THE DRAWINGS

In order to illustrate the technical solution of embodiments of the present application or the related technology more clearly, the accompanying drawings that need to be used in the embodiments or the related technology are described as follows. Apparently, the following figures are only described as embodiments of the present application, and those skilled in the art can obtain other accompanying drawings according to the accompanying drawings provided in the present application without a creative work.

DETAILED DESCRIPTION

The technical solutions of the embodiments of the present application are further described clearly and completely below in combination with the accompanying drawings. Apparently, the embodiments as described are only partial embodiments of the present application, not all the embodiments. The other embodiments obtained by those skilled in the art without a creative work according to the embodiments of the present application should be covered within the protection scope of the present application.

The present application aims to provide a drop preparation device and a preparation method thereof, which can improve the quality drop as produced.

Figure 1:
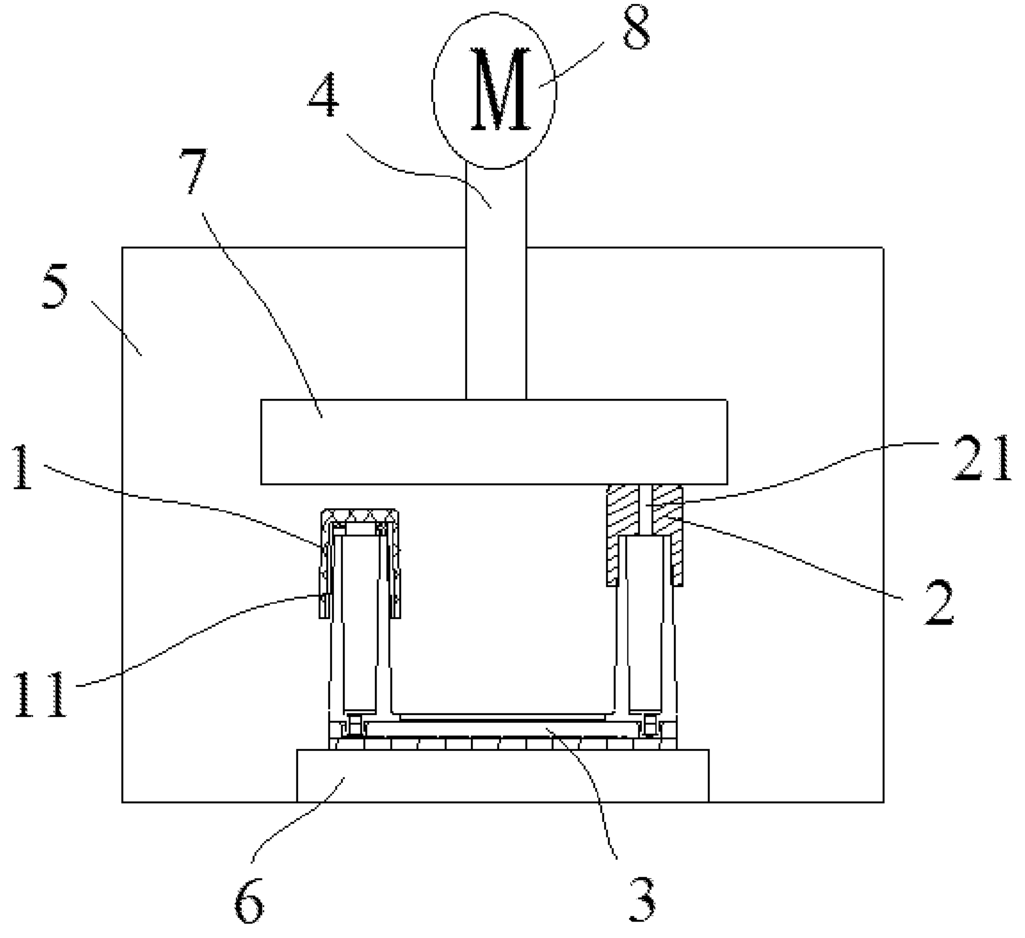
FIG. 1 is a structural schematic view of a drop preparation device according to an embodiment of the present application.
Figure 2:
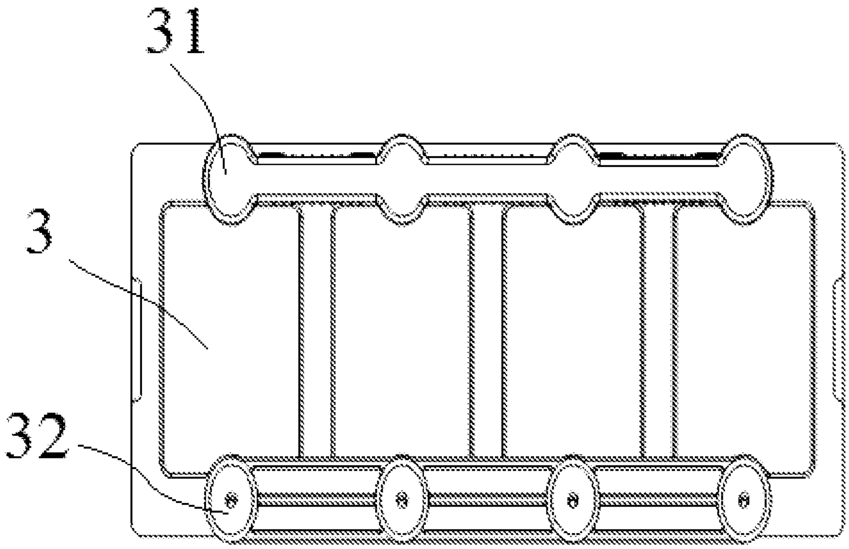
FIG. 2 is a top view of a cavity in a chip of the drop preparation device according to an embodiment of the present application.

Referring to FIGS. 1-2, the drop preparation device according to an embodiment of the present application includes a cavity 5, a chip 3, a pressure detection unit 9, a temperature control module 6, a pressing assembly 4 and a perforated cap 2.

The cavity 5 is connected with a pressure source 10, and a pressure in a sealed cavity 5 can be changed. The pressure source 10 can be a positive pressure device or a negative pressure device, configured for pressurizing the sealed cavity 5 or releasing a pressure within the sealed cavity 5. An electromagnetic relief valve can also be provided in the sealed cavity 5, which is configured to control the pressure in the sealed cavity 5 precisely in combination with the pressure source 10. The chip 3, the temperature control module 6 and a pressure detection unit 9 are all provided in the cavity 5. Specifically, the temperature control module 6 and the pressure detection unit 9 are positioned outside the chip 3.

The chip 3 is a specifically a microfluidic chip. The chip 3 has two chip ports provided at the top thereof, which are an sample inlet 31 and an oil inlet 32. A pressure working chamber is formed in the cavity 5, which can provide a pressure into the chip 3 through the sample inlet 31 and the oil inlet 32 which are in communication with the pressure working chamber. The chip 3 is filled with an oil phase before producing the drop. A sample is introduced from the sample inlet 31, and passed drop through a micro-channel in the chip 3 under the pressure to generate drops, which are dispersed in the oil phase. Meanwhile, part of the oil phase flows into the oil inlet 32.

Figure 3:
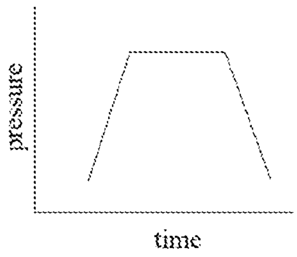
FIG. 3 is an ideal pressure controlling diagram of a cavity.
Figure 4:
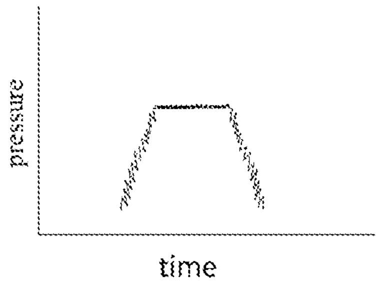
FIG. 4 is a real pressure controlling curve of a cavity.

The pressure detection unit 9 is configured for detecting the pressure data in the cavity 5. Usually, an ideal pressure controlling diagram of the cavity 5 is shown in FIG. 3, in which the pressure is stable and ascends smoothly. Actually, the pressure controlling curve of the cavity 5 is shown in FIG. 4, in which one specific pressure data is fluctuated, assuming uncertainty. Based on the results of detection, the pressure in the cavity 5 or other parameters influencing drop production can be adjusted, so as to improve the quality of drops as produced, and achieve a quick and stable drop production, solving a problem of non-uniform drop size due to pressure fluctuation.

The temperature control module 6 is configured for adjusting the temperature value in the chip 3, which is mainly used to alleviate drop size variation due to a pressure fluctuation in the cavity, so as to achieve an objective of obtaining uniform drop size in combination with pressure controlling. Specifically, the temperature control module 6 can be configured as only cooling, only heating, or both cooling and heating. In an embodiment, the temperature control module 6 can control the temperature at 20-55° C. when the drop is produced, which can improve a fluidity of oil phase to promote a forward spreading of the drops.

The perforated cap 2 has a vent hole penetrating through the perforated cap 2 along an up-down direction, and is configured to be elastically deformed along the up-down direction under a pressing force to change a volume of the vent hole 21. In an embodiment, the perforated cap 2 is prepared by an elastic material such as a rubber, a silicon rubber, polyurethane, and the like. In an embodiment, the perforated cap 2 is directly connected to the oil inlet 32.

The pressing assembly 4 includes a driving source and a pressing plate 7 connected to a bottom of the driving source, and specifically, the driving source is a pressing motor 8. The driving source is move upward or downward by the pressing plate 7 to leave or seal the perforated cap 2. Specifically, when the pressing plate 7 is moved downward, the vent hole 21 of the perforated cap 2 is pressed to achieve sealing and generate a pressure difference between the sample inlet 31 and oil inlet 32. When the pressing plate 7 is moved upward, it leaves the vent hole 21 to achieve unsealing, so that the pressure difference between the sample inlet 31 and oil inlet 32 is eliminated. In particular, when the pressing assembly 4 leaves the perforated cap 2, the sample inlet 31 and oil inlet 32 can reach a pressure balance instantaneously.

When in use, the perforated cap 2 is directly connected to the oil inlet 32, the vent hole 21 comes into communication with the oil inlet 32, and the pressing assembly 4 descends to cover the top of the vent hole 21, so as to cover the oil inlet 32. After that, a positive pressure is applied into the cavity 5 through the pressure source 10, then the positive pressure is applied into the chip 3 through the sample inlet 31 by the cavity 5 to form the pressure difference, so that a large number of drops can be quickly produced in the chip 3.

The pressure data in the cavity 5 is detected by the pressure detection unit 9 in real time during the drop production process. When a detected pressure data is different from a preset pressure data, the temperature value in the chip 3 can be changed by the temperature control module 6 to ensure uniform drop size by a temperature-pressure combination mode.

In addition, the perforated cap 2 is configured to be deformable under the pressing by the pressing plate 7, so that the volume of the vent hole 21 is changed to change the pressure at an end of the oil inlet 32. After the pressing plate 7 seals the vent hole 21, further controlling a pressing distance of the pressing plate 7 can precisely control the pressure at the end of the oil inlet 32. Greater pressing distance of the pressing plate 7 leads to a greater pressure in the oil inlet 32; and conversely, to a smaller pressure in the oil inlet 32. Therefore, uniform drop size can be guaranteed by temperature-pressure combination mode of the pressing assembly 4 with pressure based on the above features of the perforated cap 2.

Certainly, uniform drop size can also be guaranteed by a mode of combining temperature, pressure and the lifting motion of the pressing assembly 4, that is, adjusting the temperature control module 6 and the pressing assembly 4 at the same time.

In an embodiment, the pressure detection unit 9 can detect the pressure data in real time, and control the temperature control module 6 to adjust the temperature value and/or a pressing condition of the pressing assembly 4, so as to adjust a production speed and drop size of the drops during drop production, which can eliminate an impact on the drop due to a difference between a current pressure data and the preset pressure data to improve the quality of drops as produced. Then the pressure difference between the sample inlet and the oil inlet reaches an equilibrium by slowly lifting the pressing assembly 4 until it leaves the perforated cap 2. At this time, the drop production is stopped, the drops stop moving, and air exhausting is performed via an exhaust hole in the cavity 5 to reach an equilibrium between the pressures inside and outside the cavity 5, so that a large number of drops can be produced uniformly and quickly.

In an embodiment, the drop preparation device further includes a vent cap 1. As shown in FIG. 1, an air inlet channel 11 is formed between an inner surface of the vent cap 1 and an outer surface of the chip 3 close to the sample inlet; and a bottom of the air inlet channel 11 acts as an inlet end, and a top end thereof is in communication with the sample inlet 31. In an embodiment, the vent cap 1 is an elastic component, a hard object, a plastic or a metal part.

In an embodiment, air in the cavity 5 enters the bottom of the air inlet channel 11, and then enters sample inlet 31 from the top of the air inlet channel 11 to drive the sample to enter the chip 3. The presence of the vent cap 1 guarantees that the pressure in the cavity 5 can enter the sample inlet 31 through the air inlet channels 11. Meanwhile, the presence of the vent cap 1 controls the air of the cavity 5 to enter the sample inlet 31 through the inlet end at the bottom of the air inlet channels 11, which can prevent a large amount of unexpected substances from falling into the sample inlet 31 from above to influence the drop production and contaminate the chip 3, achieving an objective of dust and contamination prevention.

In an embodiment, when the vent cap 1 and the perforated cap 2 are separately connected to the two chip ports, a top surface of the perforated cap 2 is higher than that of the vent cap 1, the pressing assembly 4 is pressed to cover a top surface of the vent hole 21 to cover a first chip port directly connected to the perforated cap 2, and a second chip port is in communication with the cavity 5. A lower height of the vent hole 21 than that of the perforated cap 2 facilitates the pressing assembly 4, after being pressed, to seal only the vent hole 21 and the first chip port directly connected to the vent hole 21, while the second chip port is in communication with the cavity 5.

In an embodiment, a part of a top surface the first chip port directly connected to the perforated cap is covered by the perforated cap 2, and the remaining part thereof is in communication with the vent hole 21.

In particular, the vent hole 21 is a cylindrical hole, and has an optional diameter of 0.5-3 mm, since a too small diameter suffers from poor processibility and blockage, and too large diameter tends to cause drop back-flow when the pressure is released from the two chip ports of the chip 3.

In an embodiment, an area of the vent hole 21 is less than that of the oil inlet 32, which can prevent large particulate substances from falling into the chip 3 to negatively influence the drop preparation. In addition, the vent hole 21 can prevent a drop fusion due to a large volume change of the cavity 5 of the oil inlet 32 during ascending of the pressing assembly 4.

In an embodiment, the chip 3 includes an inlet arm 33, an outlet arm 34 and a bottom arm provided between bottom of the inlet arm 33 and bottom of the outlet arm 34 to form a U-shaped structure by the inlet arm 33, the outlet arm 34 and the bottom arm. The top end of the inlet arm 33 acts as the sample inlet 31, and the top end of the outlet arm 34 acts as the oil inlet 32. The structure is simple. Specifically, the top ends of the inlet arm 33 and the oil inlet 32 have the same heights.

In an embodiment, the chip 3 is attached onto a top surface of the temperature control module 6 under pressure to avoid an interference to the movement of the pressing assembly 4 and ensure a temperature control effect of the chip 3 by the temperature control module 6.

In an embodiment, the vent hole 21 of the perforated cap 2 is sealed by the pressing assembly 4 before the chip 3 is pressurized through the cavity 5. After the cavity 5 is pressurized, the pressure in the cavity 5 can supply a pressure to the chip 3 via the sample inlet 31, so as to generate a pressure difference across the chip 3, by which a large number of the drops can be quickly produced in the chip 3. A drop production speed can be adjusted by adjusting the pressure data of the cavity 5, the temperature value of the temperature control module 6 and the pressing distance of the pressing assembly 4, so that a large number of uniform and stable drops can be quickly produced in a short time.

Adopting the drop preparation device in present application can effectively improve the drop production speed, quickly produce a large number of drops in a short time to meet requirements of a high-throughput test, effectively decrease a possibility of back-flowing, reduce a structure requirement of the drop preparation device for a microfluidic chip, and achieve a low cost and easy processing of the microfluidic chip more easily. In addition, the drop can be controlled by a dynamic equilibrium to ensure a stable rising and lowering of the pressure and more uniform size of drops as produced, achieving a more reliable detection result.

In another embodiment, the vent cap 1 and the perforated cap 2 can be alternatively connected with the two chip ports. Specifically, the vent cap 1 is directly connected to the oil inlet 32, and the perforated cap 2 is directly connected to the sample inlet 31, in which an air outlet channel is formed between the inner surface of the vent cap 1 and the outer surface of the chip 3 close to the oil inlet 32, and the bottom of the air inlet channel acts as an outlet end, and a top end thereof is in communication with the oil inlet 32. The perforated cap 2 is in communication with the sample inlet 31. In addition, a top surface of the perforated cap 2 is higher than that of the vent cap 1, and the pressing assembly 4 is pressed to cover the top surface of the vent hole 21 so as to cover the sample inlet 31.

For producing drops, the pressing assembly 4 is pressed to cover the vent hole 21, the pressure in the cavity 5 is changed to a negative pressure, and the pressure of the oil inlet 32 is decreased, so as to form a pressure difference between the sample inlet 31 and the oil inlet 32. The sample enters the micro-channel from the sample inlet 31 to produce drops, the oil phase enters the oil inlet 32 and the pressure is released from the sample inlet 31 to finish the drop production process.

Figure 5:
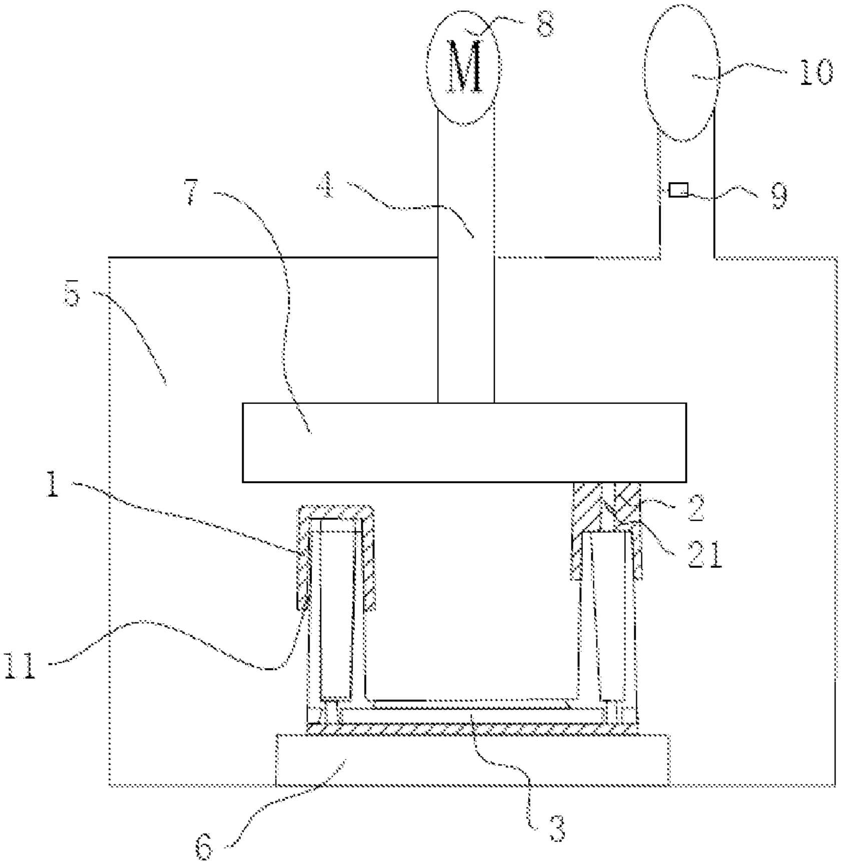
FIG. 5 is a schematic structural view of a drop preparation device according to an embodiment of the present application.
Figure 6:
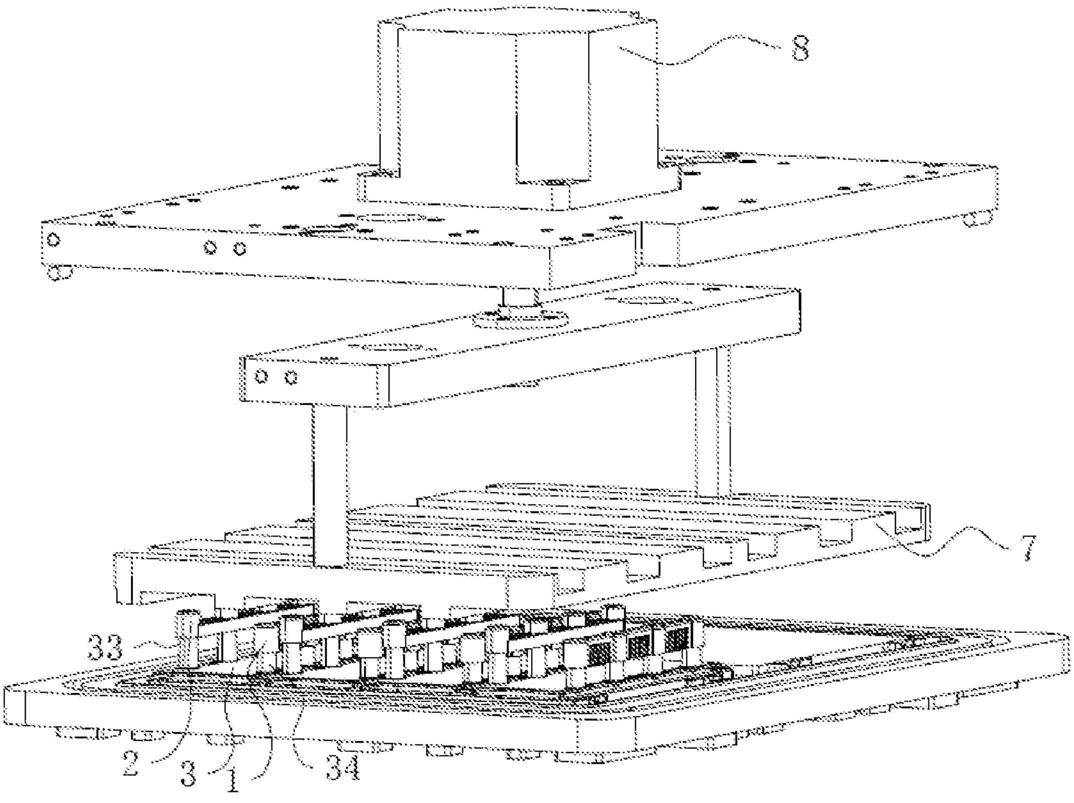
FIG. 6 is an internal schematic structural view of a drop preparation device according to an embodiment of the present application.

In another embodiment of the present application, referring to FIGS. 5-6, the drop preparation device is provided in the housing, which includes a base, the chip 3, the pressing assembly 4, the pressure detection unit 9 and the temperature control module 6. In particular, the housing is formed with a sealed cavity 5, provided with an airtight opening, and fixedly connected with a pressure pipe at the airtight opening connected to a pressure source 10. The pressure in the sealed cavity 5 can be controlled and changed by the pressure source 10. The pressure source 10 is configured for pressurizing the cavity 5 or releasing pressure in the cavity 5. An electromagnetic relief valve can also be provided in the sealed cavity 5, so as to control the pressure in the sealed cavity 5 precisely in combination with the pressure source 10. In this embodiment, the pressure source 10 provides a positive pressure into the cavity 5. The pressing assembly 4, the chip 3, the temperature control module 6 and the base are installed in the housing from up to down along a vertical direction, and the pressure detection unit 9 is installed in the pressure pipe. The pressure detection unit 9 and the temperature control module 6 are electrically connected to an operation system. In an embodiment, the pressure detection unit 9 can be a pressure sensor or other components for detecting a change in pressure. In an embodiment, the temperature control module 6 can be a component such as a heating film or a semiconductor, and the like.

Figure 7:
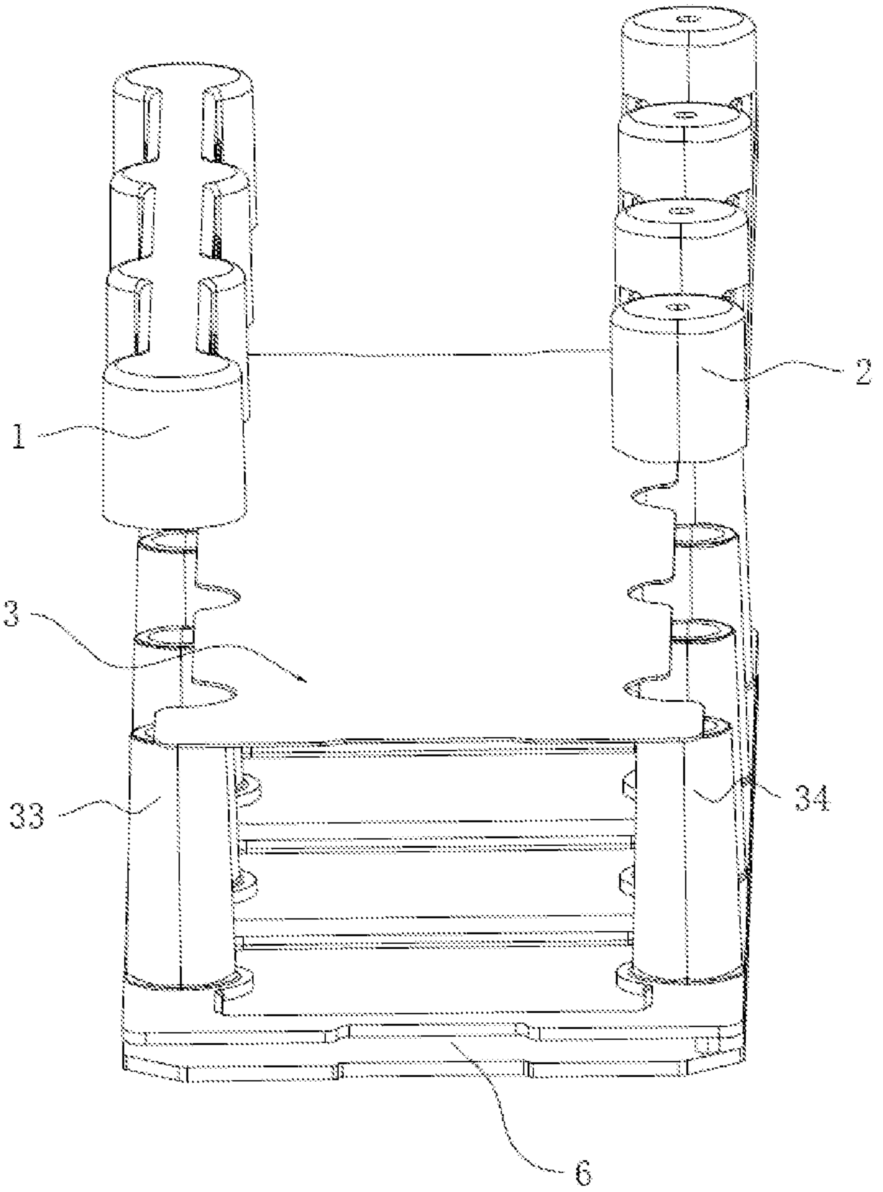
FIG. 7 is an explosion view of a chip and a temperature control module, illustrating a connection mode of the chip.
Figure 8:
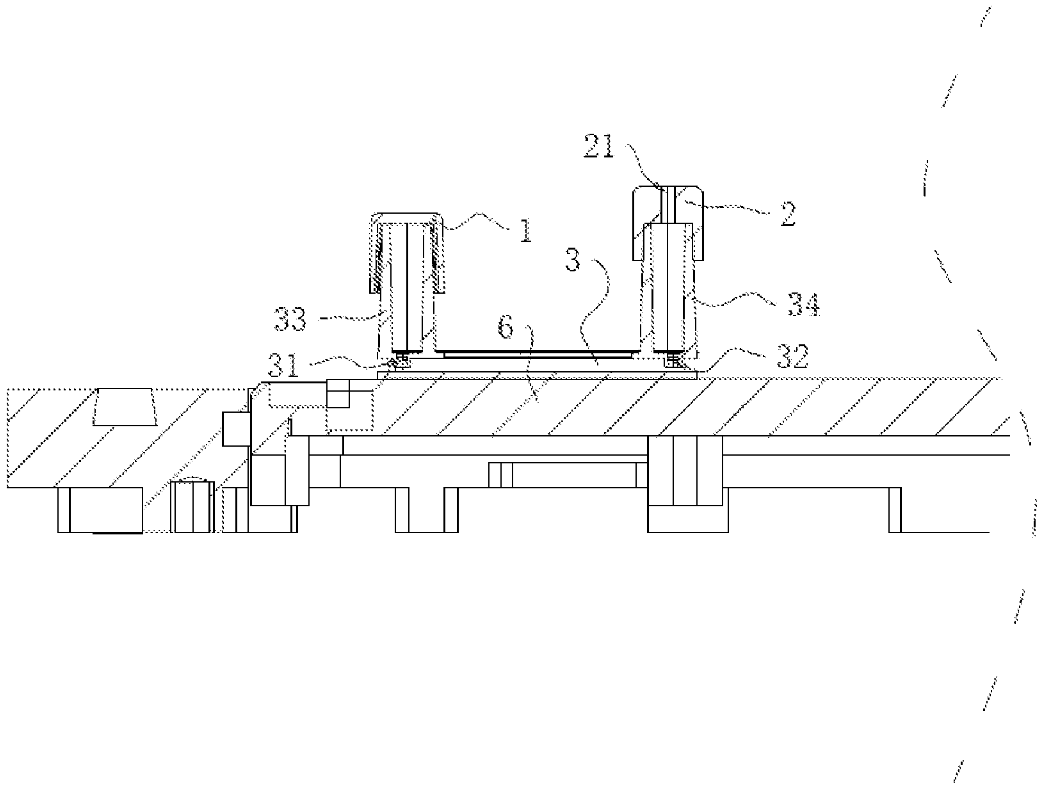
FIG. 8 is a schematic sectional view of a drop preparation device according to an embodiment of the present application.

Referring to FIGS. 7-8, the chip 3 includes a chip body and a chip cover plate. The chip body and the chip cover plate are stacked along the vertical direction and sealingly connected with each other, and a micro-channel is formed between the chip body and the chip cover plate. The inlet arm 33 and the outlet arm 34 extend from the chip cover plate along a direction away from the base. In this embodiment, the ends of the inlet arm 33 and the outlet arm 34 close to the pressing assembly 4 are flush with each other. The inlet arm 33 is formed with an inlet cavity penetrating therethrough in the vertical direction, an end of the inlet arm 33 close to the base is formed with the sample inlet 31 located at a bottom of the inlet cavity. An end of the inlet arm 33 away from the chip body is formed with a first connecting port located on a top of the inlet cavity. An area of the first connecting port is greater than that of the sample inlet 31, and the inlet arm 33 is in communication with the chip body. The vent cap 1 is sleeved on an end of the inlet arm 33 away from the base, and detachably connected to the inlet arm 33, by detachable connection such as threaded connection, snap-in groove connection, and the like. The vent cap 1 has a downward opening. An inner wall of the vent cap 1 is defined with an air inlet channel 11 along the vertical direction, which is in communication with the inlet cavity. The outlet arm 34 is provided with an oil cavity penetrating therethrough the vertical direction, an end of the outlet arm 34 away from ground is defined with the oil inlet 32 located at a bottom of the oil cavity. An end of the outlet arm 34 close to the chip body is defined with a second connecting port located on a top of the oil cavity. The area of the second connecting port is greater than that of the oil inlet 32, and the outlet arm 34 is in communication with the chip body. An end of the outlet arm 34 away from the base is detachably connected with the perforated cap 2, by detachable connection way such as threaded connection, snap-in groove connection, and the like. In an embodiment, the perforated cap 2 is an elastic component. The perforated cap 2 has the vent hole 21 penetrating therethrough along the vertical direction. The perforated cap 2 is in communication with the outlet arm 34, and a projection of the perforated cap 2 along the vertical direction is within a projection range of the oil cavity. A reinforcing rib is fixedly connected between multiple perforated caps 2 to reduce a deformation difference between the multiple perforated caps 2.

Referring to FIG. 6 and FIG. 8, the pressing assembly 4 includes the driving source, a fixing board and the pressing plate 7. The fixing board is fixedly connected to the housing. In an embodiment, the driving source is a pressing motor 8 which is electrically connected with a control device. In this embodiment, the control device can be an operation system such as PLC system. The pressing motor 8 is fixedly installed at the top of the hosing and slidably connected to the pressing plate 7 by a screw rod. The pressing plate 7 is integrally formed with a pressing block facing towards the base. When the pressing motor 8 drives the pressing plate 7 to slide towards the chip 3, the pressing block abuts against the perforated cap 2 and covers the vent hole 21 thereof, so that a pressure difference can be produced in the chip 3 during ventilation of the sample inlet 31, thereby producing drops by a liquid in the micro-channel After the pressing block abuts against the perforated cap 2, the pressing plate 7 continues to slide towards the chip 3, and the perforated cap 2 is elastically deformed under the pressure, so as to change the volume of the vent hole 21 and, in turn, the pressure at the oil inlet 32, and further adjust the pressure difference in the micro-channel and, in turn, the drop size.

The implementation principle of the embodiment is as follows. The pressing motor 8 is driven to drive the pressing plate 7 to descend until the pressing block abuts against the perforated cap 2 to cover the vent hole 21. Then the pressure source 10 is adjusted to form a positive pressure in the cavity 5, so that a large number of uniform drops are quickly formed from the liquid in the micro-channel, while the oil phase flows out of the oil inlet 32. In addition, during producing drops, after the perforated cap 2 is closed, the pressing plate 7 is driven to continue to ascend or descend, so that the perforated cap 2 is elastically deformed under the pressure to change the volume of the vent hole 21, which can further change the pressure at the end of the oil inlet 32. In addition, the pressure data in the cavity 5 is detected by the pressure detection unit 9. When the detected pressure data is different from the preset pressure data, the pressure in the chip 3 can be changed by changing the temperature value in the chip 3 by the temperature control module 6 and controlling the pressing assembly 4 to ensure uniform drop size. After producing the drop, the pressing plate 7 can be driven to slowly ascend until the pressing plate 7 leaves the perforated cap 2, by which the vent hole 21 is in communication with the cavity 5 again, so that the pressure difference between the sample inlet 31 and the oil inlet 32 reaches an equilibrium. At this time, the production of drop is stopped, and the drops stop moving. The air in the cavity 5 is released, so that the pressure difference in the cavity 5 reaches a balance with that of an external environment. Thereby, the drops can be produced uniformly and quickly.

Figure 9:
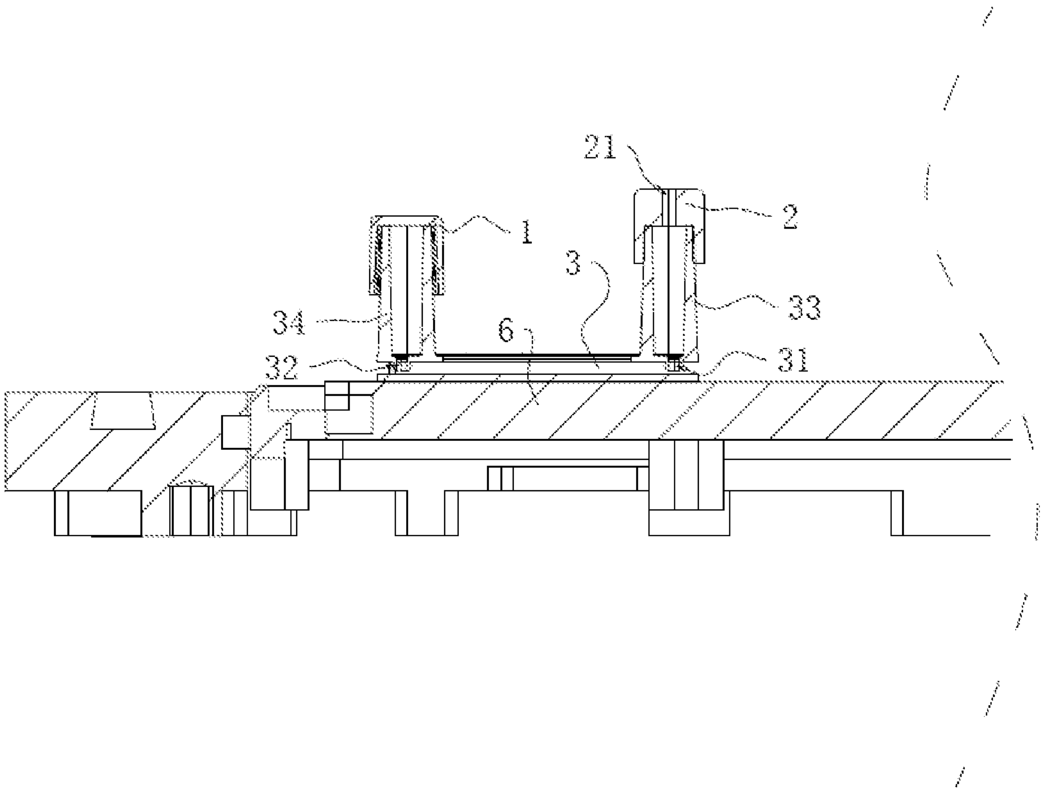
FIG. 9 is a schematic sectional view of a drop preparation device according to an embodiment of the present application.

In another embodiment, the pressure provided by the pressure source 10 in the cavity 5 is a negative pressure. Referring to FIG. 9, the perforated cap 2 is sleeved on the inlet arm 33, and the vent cap 1 is sleeved on the outlet arm 34. An experimental principle is as follows. For producing drops, the pressing assembly 4 drives the pressing plate 7 to cover the vent hole 21 and the pressure source 10 is controlled to change the pressure in the cavity 5 to a negative pressure, which decreases the pressure at the oil inlet 32 and forms the pressure difference between the sample inlet 31 and the oil inlet 32. The sample enters the micro-channel from the sample inlet 31 to produce the drops under actions of the pressure difference and the temperature, while the oil phase enters the oil inlet 32. Then the pressure in the cavity 5 is restored and the pressure is released from the end where the sample inlet 31 is located to finish the production of drops.

The present application further provides a drop preparation method in addition to the above drop preparation device. The drop preparation method is applied with the drop preparation device. The drop preparation device can be one of the above drop preparation devices provided in any embodiments, and beneficial effects can be found referring to the above each embodiment.

The drop preparation method includes:

receiving a pressure data detected by the pressure detection unit 9 in real time;

determining whether the pressure data is within the preset pressure range; and, if yes, performing a selected adjusting step so that an actual drop size in the chip 3 is equal to the drop size under the preset pressure range;

wherein at least one adjusting step is a first adjusting step, including adjusting the temperature value by only controlling the temperature control module.

Specifically, performing the first adjusting step includes the following steps after selecting the first adjusting step:

when the actual pressure data in the cavity 5 detected in real time is greater than a maximum preset pressure deviation value, decreasing the temperature of the temperature control module 6 to make the drop flow slowly and achieve an objective that the drop size is equal to the drop size under the preset pressure value; and when the actual pressure data in the cavity 5 detected in real time is lower than a minimum preset pressure deviation value, increasing the temperature of the temperature control module 6 to make the drop flow quickly and achieve an objective that the drop size is equal to the drop size under the preset pressure value.

In particular, the preset pressure value is one of values within the preset pressure range, in which the maximum preset pressure deviation value is a maximum value within the preset pressure range and the minimum preset pressure deviation value is a minimum value within the preset pressure range. The minimum preset pressure deviation value is less than the preset pressure value, which is less than the maximum preset pressure deviation value. In addition, the preset pressure value and the preset pressure range at every moment can be set according to demand, which can be the same or different.

Further, when the perforated cap 2 is directly connected to the oil inlet 32 and the pressing assembly 4 covers the vent hole 21, at least one adjusting step is a second adjusting step, including only adjusting the pressing force against the perforated cap 2 by the pressing assembly 4.

Specifically, at the selected second adjusting step, a pressing distance of the pressing plate 7 is adjusted to improve the drop quality.

Performing the second adjusting step includes the following steps:

when the actual pressure data detected in real time is greater than the maximum preset pressure deviation value, and the pressing plate 7 is lowered to compress the perforated cap 2, which decreases an air volume and increases the pressure in the vent hole 21, and further decreases the pressure difference between the two ends of the chip 3. Therefore, the drop flows slowly, which achieves an objective that the drop size is equal to the drop size under the preset pressure value; and when the actual pressure data detected in real time is lower than the minimum preset pressure deviation value, the pressing plate 7 is lifted, which increases the air volume and decreases the pressure in the vent hole 21 to increase the pressure difference between the two ends of the chip 3. Therefore, the drop flows quickly, which achieves the objective that the drop size is equal to the drop size under the preset pressure value.

Further, when the perforated cap 2 is directly connected to the oil inlet 32 and the pressing assembly 4 covers the vent hole 21, at least one adjusting step is a third adjusting step, including adjusting the temperature value by controlling the temperature control module 6 while adjusting the pressing force against the perforated cap 2 by the pressing assembly 4.

Specifically, at the selected third adjusting step, the drop production quality is improved by controlling temperature value of the temperature control module 6 and adjusting the pressing distance of the pressing plate 7.

Performing the third adjusting step includes the following steps:

when the actual pressure data detected in real time is greater than the maximum preset pressure deviation value, the pressing plate 7 is lowered to decrease the air volume of the vent hole 21, while lowering the temperature of the temperature control module 6. Therefore, the drop flows slowly, which achieves the objective that the drop size is equal to the drop size under the preset pressure value; and when the actual pressure data detected in real time is lower than the minimum preset pressure deviation value, the pressing plate 7 is lifted to increase the air volume of the vent hole 21, while increasing the temperature of the temperature control module 6. Therefore, the drop flows quickly, which achieves the objective that the drop size is equal to the drop size under the preset pressure value.

In particular, controlling methods of the temperature control module 6 and the pressing plate 7 can be obtained according to an actual drop production condition. Specifically, a temperature adjusting method of the temperature control module 6 can be obtained from an actual test based on factors such as different structures of the chip 3, oil phase composition, and the like. A descending distance of the pressing plate 7 vs. a compression value of the perforated cap 2 can obtained from an actual test based on factors such as different structures of the perforated cap 2.

Further, when the perforated cap 2 is directly connected to the sample inlet 31, before receiving the pressure data detected by the pressure detection unit 9, the drop preparation method further includes controlling the pressing assembly 4 to cover the vent hole 21 to further cover the sample inlet 31, and supplying a negative pressure into the oil inlet 32 through the cavity 5 to form the pressure difference in the chip 3.

In the above embodiments, the drop size can be controlled precisely according to the following empirical formulas of a model for multiple-parameter controlling the drop production. During the pressure ascending stage of the drop production, it should try to ensure an actual drop size equal to a theoretical drop value and uniform actual drop size. During the pressure descending stage of the drop production, it should effectively control an average distribution of the produced drops in the chip 3, minimize drop backflow and excessively air injection, so as to avoid significant variation in the total number of drops and impaired accuracy of the result.

The formula is:

$$r=R-A\times(\eta^{t}-\eta^{t0})\times ln(1+(p-p^{0}))-B\times(\eta^{t}-\eta^{t0})^{2}-C\times\Delta d;$$

where r is an actual radius of the drop;

R is a theoretical radius of the drop, that is, a theoretical expected value of a design dimension of a micro-channel outlet structure of the chip 3 during a reaction process of the drop production device;

$\eta^{t}$ is a viscosity of an oil in the chip 3 during temperature rising and lowering of the temperature control module 6;

$\eta^{t0}$ is a viscosity of an oil in the chip 3 at a melting point temperature;

p is an actual measured pressure value (atm) of the pressure detection unit 9 in the cavity 5.

$p^{0}$ is a 1 standard atmospheric pressure;

Δd is a zero value of a pressing origin when the pressing plate 7 is in sealed contact with the perforated cap 2, and becomes a positive value with further pressing of the pressing plate 7; and A, B and C are constants.

The formula is applied at the pressure ascending stage of the drop production. After the pressing plate 7 is in sealed contact with the perforated cap 2, when $\Delta d \geq 0$, the pressure in the cavity 5 begins to ascend, $p \geq 1$ is detected by the pressure detection unit 9, so the drop begins to be produced. The actual radius of the drop r consisting with the theoretical radius of the drop R and the even drop can be obtained through continuously monitoring the p value, and controlling the descending or ascending of Δd and the temperature control module 6.

The formula is applied at the pressure releasing stage of the drop production. The pressure of the cavity 5 begins to descend, and a descend value of p is detected by the pressure detection unit 9. In order to ensure the drop quality and drop even distribution in the cavity 5, it can effectively maintain an average distribution of the produced drops in the chip 3, minimize drop backflow and excessively air injection by dynamically monitoring the p value, controlling the descending or ascending of Δd and the temperature control module 6, which results in significant variability in a total number of drops and affects an accuracy of the result.

The above provides a detailed description to the drop production device and the production method provided in the present application. The present application illustrates the experimental principle and embodiments through applying specific examples. The above illustration of the embodiment is only prone to understand the methods and core ideas of present application. It should be alleged that, several improvements and modifications can be made to the present application by those skilled in the technical field departing from the experimental principle of the present application, which should be covered within the protection scope of the present application.

What is claimed is:

1. A drop preparation device, comprising:

a housing, a chip, a pressing assembly, and a temperature control module provided in the housing, wherein the temperature control module is provided at a bottom of the housing, the chip is provided on the temperature control module, the temperature control module is configured for adjusting a temperature value in the chip, the pressing assembly comprises a pressing motor and a pressing plate, the pressing motor is fixedly connected to the housing and slidably connected to the pressing plate, the chip comprises a sample inlet and an oil inlet, a micro-channel in the chip fluically connecting the sample inlet to the oil inlet, and a perforated cap provided at the oil inlet of the chip and the perforated cap has a vent hole penetrating through the perforated cap along a vertical direction, the perforated cap is configured to cooperate with the pressing assembly to adjust pressure in the chip, and the chip is configured such that a sample can be introduced from the sample inlet and passed drop through the micro-channel in the chip under the pressure to generate drops, which are dispersed in an oil phase, and meanwhile, part of the oil phase flows into the oil inlet.

2. The drop preparation device according to claim 1, further comprising a pressure source;

wherein the housing is a sealed cavity connected to the pressure source, the pressure source is a positive pressure device or a negative pressure device configured for pressurizing the sealed cavity or releasing a pressure within the sealed cavity; and a pressure detection unit connected to and between the housing and the pressure source, and the pressure detection unit is configured for detecting pressure data in the sealed cavity.

3. The drop preparation device according to claim 1, wherein the perforated cap covers the oil inlet of the chip, and the perforated cap is an elastic component.

4. The drop preparation device according to claim 3, wherein an area of the vent hole is less than an area of the oil inlet.

5. The drop preparation device according to claim 1, further comprising a vent cap covering in the sample inlet of the chip, and an air inlet channel formed between an inner surface of the vent cap and an outer surface of the chip.

6. The drop preparation device according to claim 5, wherein the chip comprises an inlet arm and an outlet arm, both the inlet arm and the outlet arm are fixedly connected to the chip and extend towards the pressing plate, the sample inlet is provided at a lower end of the inlet arm, the oil inlet is located at a lower end of the outlet arm, and a top end of the inlet arm acts as the sample inlet.

7. A drop preparation method using the drop preparation device according to claim 1, comprising the following steps:

presetting a pressure value by using a pressure detection unit;

adjusting the temperature value in the chip by using the temperature control module;

adjusting the pressure in the chip by using the pressing assembly;

detecting the pressure in the chip by using the pressure detection unit, and determining whether the pressure in the chip is within a preset pressure range; and, when the pressure in the chip is within the preset pressure range, stopping adjusting the temperature value and pressure; and, when the pressure in the chip is not within the preset pressure range, adjusting at least one of the pressure or the temperature value until the pressure in the chip is within the preset pressure range, wherein the pressure value preset by the pressure detection unit is a value within the preset pressure range, a maximum preset pressure deviation value is a maximum value within the preset pressure range, a minimum preset pressure deviation value is a minimum value within the preset pressure range, and the pressure value preset by the pressure detection unit and the preset pressure range can at be set according to demand.

* * * * *